United States Patent [19]

Machholz

[11] Patent Number: 4,469,736

[45] Date of Patent: Sep. 4, 1984

[54] PLANAR ELEMENT FOR THE ABSORPTION OF AIR-TRANSMITTED SOUND AND METHOD OF MANUFACTURING THE SAME

[75] Inventor: Walter Machholz, Memmingen, Fed. Rep. of Germany

[73] Assignee: Metzeler Schaum GmbH, Munich, Fed. Rep. of Germany

[21] Appl. No.: 496,663

[22] Filed: May 20, 1983

[30] Foreign Application Priority Data

May 22, 1982 [DE] Fed. Rep. of Germany ....... 3219339

[51] Int. Cl.[3] .......................... B32B 3/30; B32B 7/10

[52] U.S. Cl. ...................................... 428/159; 156/82; 156/290; 181/288; 181/291; 428/166; 428/198

[58] Field of Search ............... 428/141, 142, 158, 159, 428/160, 166, 172, 198; 181/288, 291; 156/82, 290

[56] References Cited

U.S. PATENT DOCUMENTS

| | | | |
|---|---|---|---|
| 3,356,562 | 12/1967 | Graham et al. | 428/198 |
| 3,360,423 | 12/1967 | Lindberg | 428/198 |
| 3,574,109 | 4/1971 | Yoshikawa | 428/198 |
| 3,712,846 | 1/1973 | Daniels et al. | 428/198 |

*Primary Examiner*—William J. Van Balen
*Attorney, Agent, or Firm*—Herbert L. Lerner; Laurence A. Greenberg

[57] ABSTRACT

A planar element for the absorption of air-transmitted sound, includes a flexible layer of open-cell foam material including a surface having protuberances with peaks formed thereon, and a flat closed cover layer formed of synthetic foil material fastened to the peaks of the protuberances, and a method of manufacturing the same.

5 Claims, 2 Drawing Figures

Figure 1:
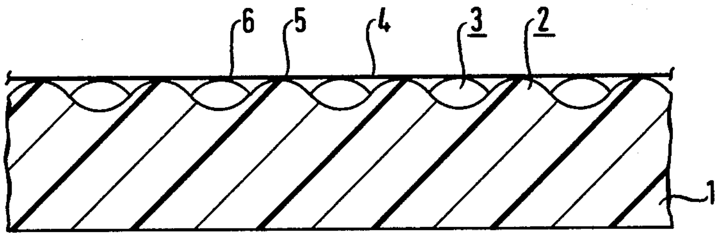

PLANAR ELEMENT FOR THE ABSORPTION OF AIR-TRANSMITTED SOUND AND METHOD OF MANUFACTURING THE SAME

The invention relates to a planar element for the absorption of air-transmitted sound, including a flexible layer of open-cell foam material and a closed cover layer in the form of a foil, as well as a method of manufacturing the element.

In the case of conventional absorption materials for sound transmitted in air, a thin foil is generally loosely applied onto the absorption materials, or, foam material laminates are permanently or fixedly connected with a foil over their entire surface area. Such foil-laminated foam materials can therefore assume the characteristics of spring-compound or mass systems, in which relatively good damping (absorption) is obtained over a relatively small frequency range.

The critical feature for the absorption behavior, i.e. rise time, resonance point and broad-band damping, is the tuning between foil and foam material mass, i.e. its respective matching, fastening and mass proportions. It is therefore also important that no additional fastening means in the form of other materials be used, since these could negatively influence the damping.

It is accordingly an object of the invention to provide a planar element for the absorption of air-transmitted sound and a method of manufacturing the same, which overcomes the hereinaforementioned disadvantages of the heretofore-known devices and methods of this general type, which have damping properties that are still improved compared to the known devices and methods, and which furthermore can be easily adapted to the respective requirements in many applications.

With the foregoing and other objects in view there is provided, in accordance with the invention a planar element for the absorption of air-transmitted sound, comprising a flexible layer of open-cell foam material including a surface having bumps or protuberances with profile peaks, tips or apexes formed thereon, and a flat closed cover layer formed of synthetic foil material fastened point to point to said peaks of said protuberances only.

In accordance with another mode of the invention the foil has a thickness of less than 50 μm.

In accordance with a further mode of the invention the foil and the foam material are connected together by flame laminating, bonding or heat sealing.

In accordance with a concomitant mode of the invention there is provided a method which comprises flame laminating the foil to the peaks of the protuberances.

Through the use of suitable bump-like profiling of the foam material and the point to point attachment of the foil, the the result is that the foil can freely vibrate, like a freely stretched membrane, which thereby assures an especially good damping effect.

Other features which are considered as characteristic for the invention are set forth in the appended claims.

Although the invention is illustrated and described herein as embodied in a planar element for the absorption of air-transmitted sound and method of manufacturing the same, it is nevertheless not intended to be limited to the details shown, since various modifications and structural changes may be made therein without departing from the spirit of the invention and within the scope and range of equivalents of the claims.

Figure 2:
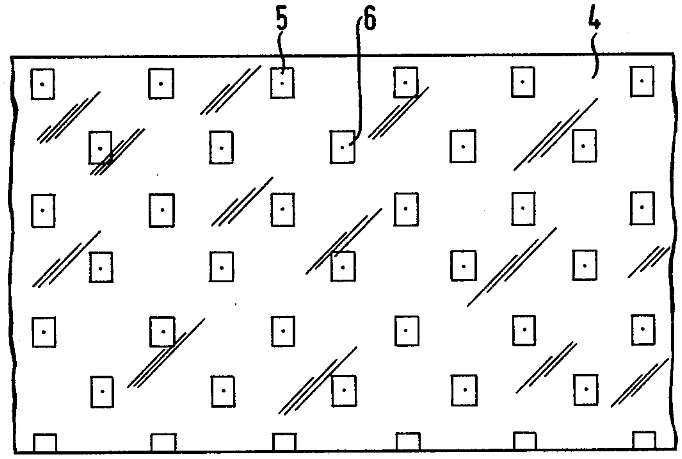

The construction and method of operation of the invention, however, together with additional objects and advantages thereof will be best understood from the following description of specific embodiments when read in connection with the accompanying drawings, in which:

FIG. 1 is a fragmentary, diagrammatic, longitudinal sectional view through an absorption element for air-transmitted sound; and FIG. 2 is a top plan view of the element of FIG. 1, with special connection points.

Referring now to the figures of the drawing in detail and first particularly to FIG. 1 thereof, it is seen that a foam material sheet 1 has a profiled surface with rows of bumps or protuberances 2 and 3 which are staggered with respect to each other. Advantageously, a polyurethane foam with a raw density of from 16 to about 80 kg/m$^3$ can be used for this purpose. A thin foil 4 of a synthetic material is laminated onto these bump-like points in such a way that the foil 4 is only connected with the foam material 1 at the points 5 and 6.

The connection is best made by flame lamination (bending or heat sealing), so that no additional material, such as adhesive, inhibits the damping. In practice, the foil can be thinner than 50 μm and be formed of polyurethane, polyethylene or PVC.

As shown especially in FIG. 2, the foil 4 is only connected to the foam material at relatively small points 5 and 6 which are spaced far apart in proportion to the contact area. This results in a large effective area of free foil regions which can freely vibrate like a membrane, and thereby absorb energy from the incident sound waves, so that optimal damping is achieved.

Through the use of this type of structure, especially low and intermediate frequencies are damped. The damping is mainly dependent on the foil thickness, in the sense that with increasing thickness of the foil, increasing lower frequencies are damped. In principle, the damping of lower frequencies is made possible by strengthening the foil and/or the foam material. A further possibility for variation of the device is to change the shape or the depth of the profile.

The special advantages of the structure according to the invention lie in the fact that the foil-like absorber or its superimposed bulk or mass is optimally coupled to the foam material bulk or mass, so that the foil adheres to the foam material without additional means.

The most important application for such planar elements are sound absorbing linings for machine housings, motor encapsulations or similar enclosures.

The foregoing is a description corresponding in substance to German Application No. P 32 19 339.4, dated May 22, 1982, the International priority of which is being claimed for the instant application, and which is hereby made part of this application. Any material discrepancies between the foregoing specification and the aforementioned corresponding German application are to be resolved in favor of the latter.

I claim:

1. Planar element for the absorption of air-transmitted sound, comprising a flexible layer of open-cell foam material including a surface having protuberances with peaks formed thereon, and a flat closed cover layer formed of synthetic foil material fastened to said peaks of said protuberances.

2. Planar element according to claim 1, wherein said foil has a thickness of less than 50 μm.

3. Planar element according to claim 1, wherein said foil and said foam material are connected together by flame laminating.

4. Planar element according to claim 2, wherein said foil and said foam material are connected together by flame laminating.

5. Method of manufacturing a planar element for the absorption of air-transmitted sound, including a flexible layer of opencell foam material including a surface having protuberances with peaks formed thereon, and a flat closed cover layer formed of synthetic foil material, which comprises flame laminating the foil to the peaks of the protuberances.

* * * * *